United States Patent
Ibragimov

(10) Patent No.: US 7,972,291 B2
(45) Date of Patent: Jul. 5, 2011

(54) SINGLE-NEEDLE DIALYSIS SYTEM UTILIZING A PERISTALTIC PUMP WITH PUMPING AND OCCLUDING ROLLERS

(76) Inventor: Araz Ibragimov, Brooklyn, NY (US)

( * ) Notice: Subject to any disclaimer, the term of this patent is extended or adjusted under 35 U.S.C. 154(b) by 94 days.

(21) Appl. No.: 12/544,190

(22) Filed: Aug. 19, 2009

(65) Prior Publication Data
US 2010/0228176 A1      Sep. 9, 2010

Related U.S. Application Data

(62) Division of application No. 11/282,323, filed on Nov. 18, 2005, now Pat. No. 7,578,662.

(51) Int. Cl.
*A61M 37/00* (2006.01)
(52) U.S. Cl. .................................................. 604/5.04
(58) Field of Classification Search ........ 604/4.01–6.16; 422/44–48; 417/474–477.13
See application file for complete search history.

(56) References Cited

U.S. PATENT DOCUMENTS 4,586,882 A * 5/1986 Tseng ........................ 417/477.3
5,368,555 A * 11/1994 Sussman et al. ............. 604/6.05

* cited by examiner

*Primary Examiner* — Leslie R Deak
*Assistant Examiner* — Philip R Wiest
(74) *Attorney, Agent, or Firm* — Bois Leschinsky

(57) ABSTRACT

A peristaltic roller pump includes a rotor carrying a pumping roller on one end and an occluding roller on the other end. Occluding roller has a number of protrusions designed to occlude the tubing section that is located under that roller as it moves over it in order to prevent any back flow through that section of the tube. Occluding roller is designed to not cause any pumping of fluid through the section of the tubing under that roller. Such design is useful in a single-needle dialysis system in which during a first phase of pumping blood is moved in one direction from the patient towards the dialysis unit and during the second phase of operation blood is returned to the patient in the opposite direction.

3 Claims, 3 Drawing Sheets

SINGLE-NEEDLE DIALYSIS SYTEM UTILIZING A PERISTALTIC PUMP WITH PUMPING AND OCCLUDING ROLLERS

CROSS-REFERENCE DATA

This application is a divisional application claiming priority from a U.S. patent application Ser. No. 11/283,323 filed Nov. 18, 2005 entitled "Peristaltic pump having pumping and occluding rollers and alternating pumping systems utilizing thereof", now U.S. Pat. No. 7,578,662.

BACKGROUND OF THE INVENTION

The present invention relates to fluid pumps in general, and more specifically to peristaltic pumps. More particularly, the pump of the invention utilizes at least one occluding roller and at least one pumping roller and can be used in various applications where alternating fluid pumping is needed. Examples of such applications include fluid mixing, single-needle hemodialysis etc.

Peristaltic pumps are well-known devices, which transfer fluid through an elongate flexible tubing by compressing a portion of the tubing, and pushing the fluid through the tubing using such compression. Peristaltic pumps are commonly used for transferring fluids such as ink for printing or for transferring fluids such as blood in medical equipment. Peristaltic pumps may also be used to transfer fluids such as cleaning agents, coolants, slurries or liquid adhesives, just to name a few of the many fluids that can be transferred with such pumps. One advantageous feature of peristaltic pumps is that the fluid does not contact the pump mechanism since the fluid is always confined within and moved through the flexible tubing. Therefore, peristaltic pumps may be used to transfer corrosive or caustic solutions or other hazardous fluids without affecting the pump mechanism.

In a typical peristaltic pump, the tubing is compressed by one or more rollers that are driven by an electric or air-powered motor. Each roller compresses the tubing as it moves along the length of the tubing. Also typically, the flexible tubing is fed through the pump along a generally U-shaped path or alternatively along a substantially straight arc-shaped path (in the case of a pass-through pump) so that the U-shaped or arc-shaped portion of the tubing overlaps a portion of a path traveled by the rollers.

Typical examples of prior art roller pumps may be found in these U.S. Pat. Nos. 5,927,951; 5,630,711; 5,415,532; 4,906,168; and 4,755,168.

Modifications of the classic roller pump configuration is found in the U.S. Pat. No. 5,064,358 describing the design capable of pumping two liquids at the same time. Willock describes a single-needle dialysis system utilizing a roller pump in his U.S. Pat. Nos. 3,938,909 and 3,848,592. Of interest here is the area of application of the roller pump requiring alternating pumping of blood from the patient to the blood dialysis device and back into the patient via the same path.

Such systems are rather complicated and require various valve and control mechanisms to ensure proper redirection of fluid pumping using a standard roller pump. The need exists therefore for a roller pump providing alternating fluid pumping inherently and without changing the direction of rotation or additional external valves and control system.

The need also exists for a roller pump capable of pumping at least two flows independently with a single roller system rotating in the same direction at all times.

SUMMARY OF THE INVENTION

Accordingly, it is an object of the present invention to overcome these and other drawbacks of the prior art by providing a novel roller pump capable of independent pumping of at least two fluids with a single roller rotating in the same direction.

It is another object of the present invention to provide a roller pump and a system utilizing thereof for alternating pumping of fluid from and to the same source and destination without the need to reverse pump direction of rotation or incorporate various control valves outside the pump housing.

It is a further object of the present invention to provide a roller pump equipped with means to occlude the tubing inside the roller pump housing in a way that avoids flow interruption in a chosen direction.

The roller pump of the invention is based on the general principle of incorporating at least one pumping roller and one occluding roller into the peristaltic mechanism of the pump. The pumping roller is made similar to the rollers of known peristaltic pumps. The occluding roller located for example across the pumping roller is made to provide occlusion only and not progressive squeezing of the pump tubing while rotating in the same direction as the pumping roller. Such occlusion prevents back-flow and provides for a necessary flow interruption while the pumping roller is moving to provide fluid flow from the pump tubing.

Various advantageous systems using such pump include the following examples:

- single-needle dialysis system providing forward flow of blood into the dialysis apparatus alternating with return flow of filtered blood back to the patient,
- single-needle system for transfusion of blood providing removal of blood during the forward flow and replacement with fresh donor blood during the return flow back to the patient,
- alternating pumping system providing movement of blood or other biological, chemical or hazardous fluid between two closed reservoirs, providing forward and backward flows,
- chemical and biological mixing devices, and
- other alternating pumping systems described below in more detail.

The roller pump of the invention allows advantageous control over two flows of fluid at the same time without reversing the pump head or using of external control valves. It also allows for inherently simple alternating pumping of the same fluid, such as in a single-needle dialysis apparatus. One particularly advantageous use of the pump of the present invention is together with the single-needle dialysis device as described in a co-pending U.S. patent application Ser. No. 10/662,064 filed Sep. 15, 2003 by the same inventor and entitled MANUALLY OPERATED DISPOSABLE SINGLE-NEEDLE CIRCUIT FOR EXTRACORPOREAL TREATMENT OF BLOOD incorporated herein in its entirety by reference.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF THE PREFERRED EMBODIMENT OF THE INVENTION

A detailed description of the present invention follows with reference to accompanying drawings in which like elements are indicated by like reference letters and numerals.

Figure 1:
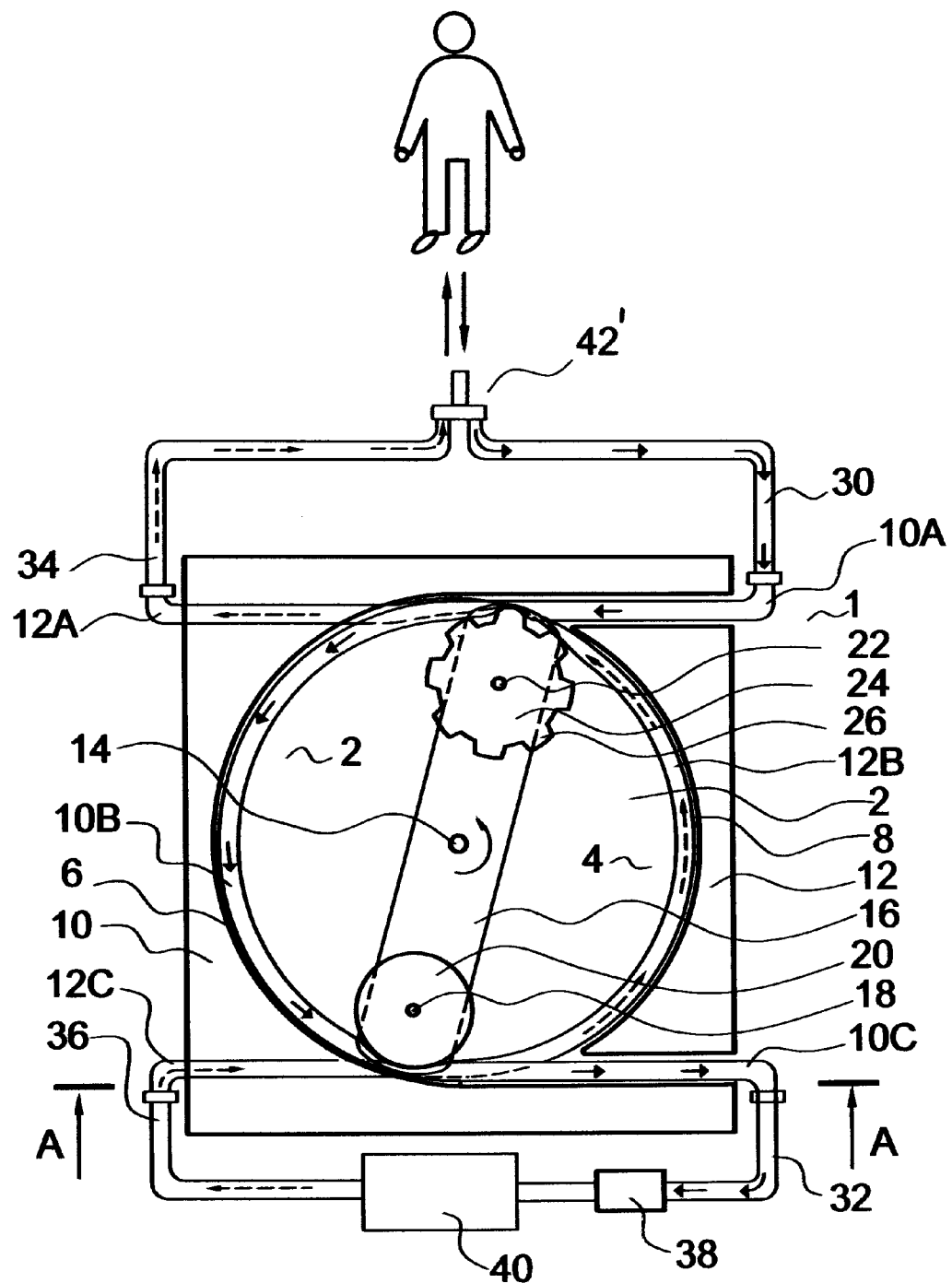
FIG. 1 is a general top view of the roller pump of the invention with removed top cover as well as a schematic representation of one example of pump operation, namely a single-needle dialysis.

The roller pump of the invention comprises a housing 1 with a circular internal opening 2 incorporating an optional pair of tubing races 6 and 8 and including a rotor assembly 4, as well as the external tubing extensions 30, 32, 34, and 36 as shown in detail on FIG. 1. Elastic tubing sections 10 and 12 are positioned inside the housing and placed in contact with the tubing races 6 and 8 respectively. The rotor assembly 4 in turn includes a central shaft 14 driven by any commonly known means (not shown on the drawings) for example an electrical motor. The shaft 14 carries a rotor 16, which includes two symmetrical arms: one arm carrying a pumping roller 20 freely rotating about the axis 18 and the other arm carrying an occluding roller 24 freely rotating about its axis 22.

Figure 4:
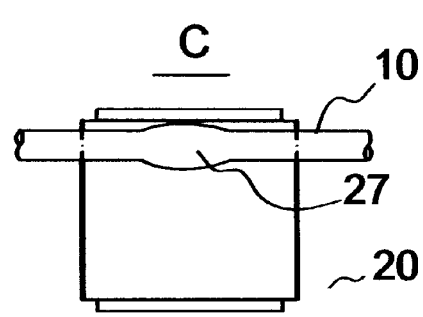
FIG. 4 is the side view of the occluding roller from the direction B shown on FIG. 3.
Figure 3:
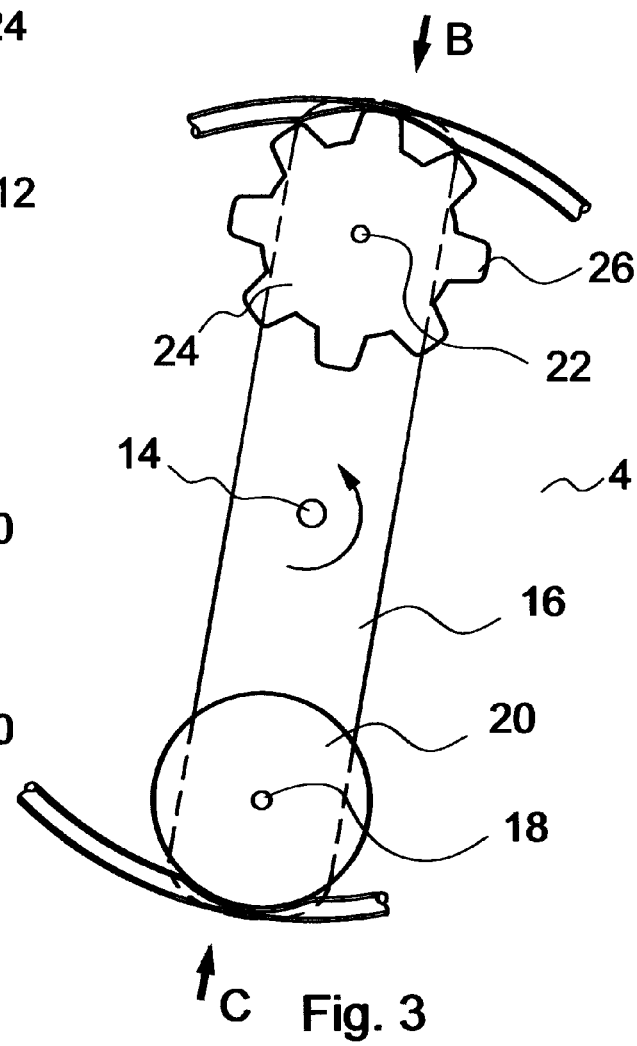
FIG. 3 shows the enlarged view of the roller showing the details of the main rotor carrying a pumping roller and an occluding roller and the tubing compressed by these rollers.
Figure 2:
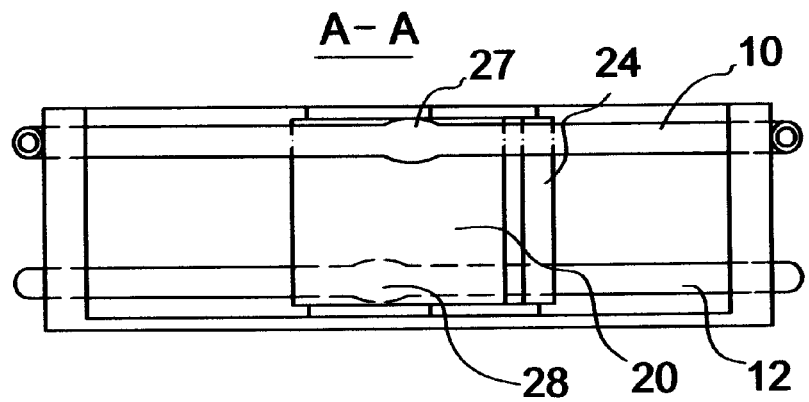
FIG. 2 is the general side cross-sectional view of the roller pump of the present invention along the lines A-A shown on FIG. 1.

The pumping roller 20 is made using common design principles of peristaltic pumps. It has smooth circular outer surface designed to occlude the pump tubing and to progressively squeeze the fluid out of it in the direction of rotation of the rotor 16. FIGS. 2 and 4 show the occluded section 27 of the elastic tubing section 10 as the pumping roller 20 is moved forward by the rotor of the pump.

The occluding roller 24 is equipped with a plurality of protrusions extending from the central portion such as for example occluding teeth 26 making it look similar to the gear wheel. Importantly, the protrusions are spaced apart sufficiently wide to allow the portion of the elastic tubing between two adjacent protrusions to regain at least in part its original non-compressed shape. At the same time, the space between each pair of adjacent protrusions should not be wide enough to allow any free flow inside the tubing. In other words, as at least one protrusion should be in contact with the tubing at all times and provide adequate occlusion thereof and prevent any back flow therethrough.

Figure 5:
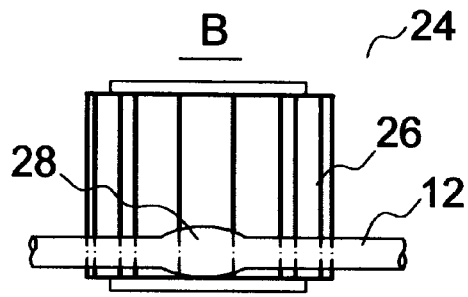
FIG. 5 is a side view of the pumping roller from the direction C shown on FIG. 3.

As a result, the shape and number of protrusions such as teeth 26 are chosen to ensure that the roller 24 only occludes the elastic tubing of the pump and not progressively squeezes the fluid out of it as it is moved forward by the rotor 16. FIGS. 2 and 5 illustrate the flattened section 28 of the tubing section 12. Importantly, the occluding roller 24 does not have a continuously smooth outer surface and as a result does not provide peristaltic action on the tubing of the pump. On the other hand, teeth 26 provide continuous occlusion of the tubing section under the roller 24 such that the fluid cannot move through the tubing at any time.

Tubing races 6 and 8 are located in the housing 1 with an axial offset allowing tubing sections 10 and 12 to overlap each other. In particular, the tubing section 10 comprises on one side of the pump a first straight section 10A continuing into the semicircular section 10B and finally into a second straight section 10C located on the opposite side of the pump as compared with the location of the section 10A. Similarly, the tubing section 12 comprises a first straight section 12A, continuing into a semicircular section 12B and then into a second straight section 12C. The length of the tubing races 6 and 8 respectively as well as the corresponding lengths of tubing contained therein is equal or slightly more than half the perimeter of the round opening 2 of the housing 1 to ensure proper operation of the pump of the present invention.

The tubing section 10 is connected on one end with the tubing extension 30 and on the other end with the tubing extension 32. The tubing section 12 is connected respectively on one end with the tubing extension 34 and on the other end with the tubing extension 36.

Figure 6:
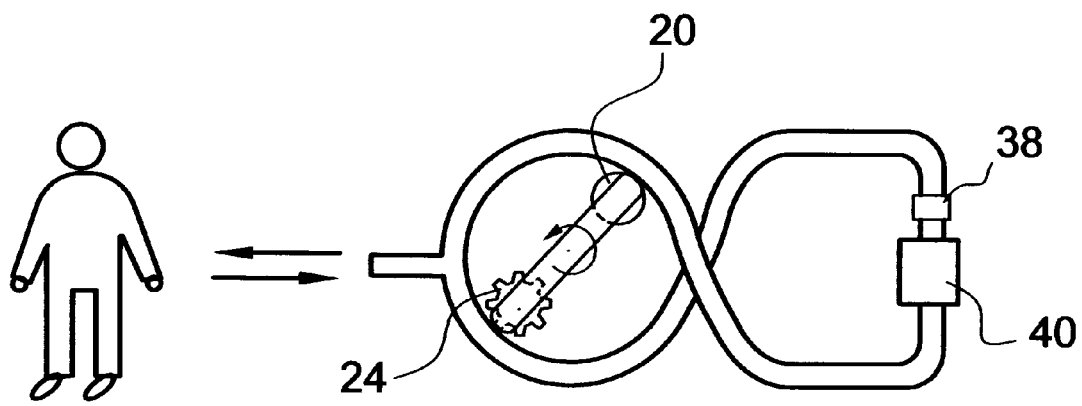
FIG. 6 is a schematic depiction of the use of the roller pump of the invention for single-needle dialysis.

For the purposes of the pump application as a single-needle dialysis apparatus, as shown on FIGS. 1 and 6, the tubing extensions 32 and 36 are connected together and include a dialysis filter 40 and a blood reservoir 38 for reducing pulsations of blood flow during the operation of the system. On the other side of the pump, the tubing extension 30 and 34 are also connected together to the proximal end of a single-needle catheter 42' designed to be connected to a dialysis access needle and provide both withdrawal and return of blood flow into the patient.

In use, the pump of the invention works in two phases, each of the phases include the 180 degree rotation of the rotor and both rollers 20 and 24. When power is provided on the shaft 14, the rotor 14 starts to move counter-clockwise (as shown on the drawing as an example only). During the first phase of operation of the pump, the roller 20 moves to the left thereby the blood is withdrawn from the patient through the catheter 42' into the tubing extension 30 and the straight section 10A of the tubing 10. Subsequent repetitive passes of the roller 20 over the tubing section 10B pumps blood into the section 10C and then into the dialysis circuit 38 and 40 and then back into the tubing section 12C of the pump. FIG. 1 shows this blood flow pathway with short arrows. At the same time, the occluding roller 24 rolls over the tubing section 12B of the tubing 12, thereby teeth continuously occlude it to prevent any straight flow therethrough.

During the second phase of the operation of the pump of the invention, the pumping roller 20 and the occluding roller 24 move to the opposite sections of the pump. The pumping roller 20 now continuously squeezes blood out of the tubing section 12C thereby returning it from the dialysis circuit towards the patient through the section 12A and into the catheter 42'. Return flow of blood is shown by interrupted arrows on FIG. 1. At the same time, the occluding roller 24 rolls over the tubing section 10B preventing any back-flow of blood by occluding the tubing 10 with teeth 26. The two-phase cycle is then repeated again.

Figure 7:
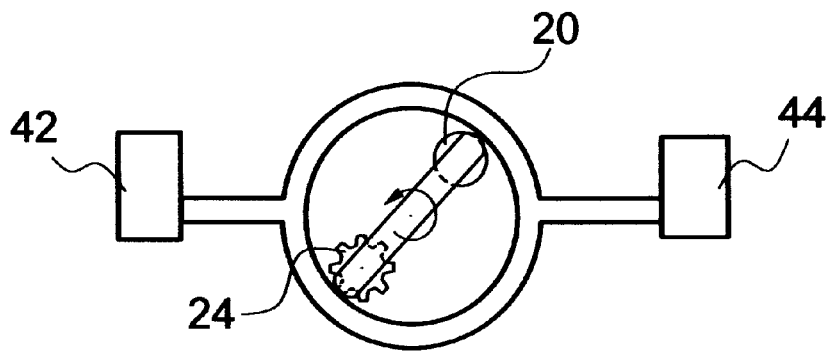
FIG. 7 is a schematic depiction of the use of the roller pump of the invention for mixing of blood or another hazardous fluid between two reservoirs.
Figure 8:
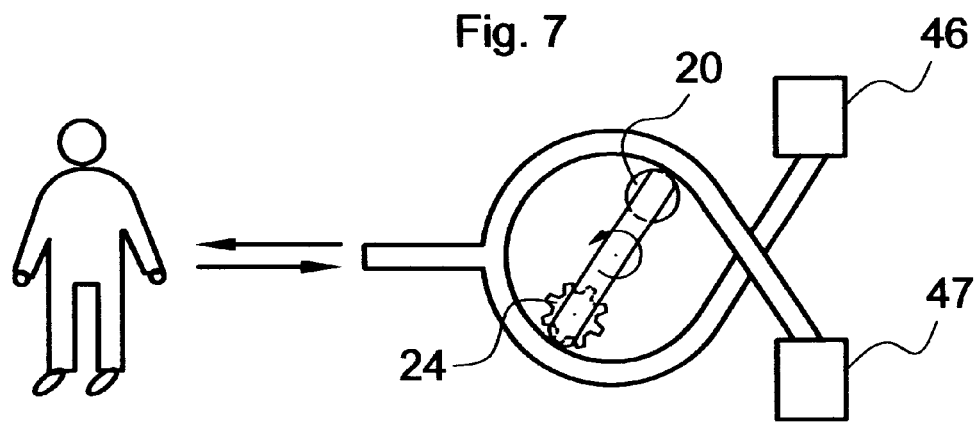
FIG. 8 is a schematic depiction of the use of the roller pump of the invention for blood replacement and transfusion using a single needle access.

Various alternating pumping systems including the above-described peristaltic pump are shown schematically on FIG. 6 through FIG. 8. FIG. 6 shows the above-described use of the pump as part of the single-needle dialysis system.

FIG. 7 shows the system adapted to alternate the flow of fluid between two reservoirs 42 and 44. During the first phase of operation, the pumping roller moves the fluid from the reservoir connected to a first access port towards the second access port connected to reservoir 42 while the occluding roller 24 prevents any back-flow. During the second phase of operation, the pumping roller 20 moves along the other side of the tubing and pumps fluid back from the reservoir 42 towards the reservoir 44, while the occluding roller 24 again prevents any back flow. This system can be used advantageously for mixing various fluids together.

Finally, FIG. 8 shows blood infusion and replacement system in which the fresh blood is pumped from the reservoir 46 towards the patient through an injection catheters while the old patient's blood is removed through the same injection catheter and pumped towards the draining reservoir 47 in the same manner as previously described. A similar system can also be designed for pulsating washout of a cavity or reservoir of interest with a cleaning solution. In that case, fresh solution is constantly infused replacing the dirty previously used portion of the cleaning solution.

Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A single-needle dialysis system comprising:
a peristaltic roller pump comprising a housing with an internal circular opening, said opening including a first half and a second half; a first elastic tubing section placed along and in contact with said first half of said circular opening and having a first tubing extension and a second tubing extension; a second elastic tubing section placed along and in contact with said second half of said circular opening and having a third tubing extension and a fourth tubing extension; and a rotor assembly including a rotor carrying a freely rotating occluding roller on one end and a freely rotating pumping roller on the opposite end of said rotor, said occluding roller comprising a plurality of protrusions extending from a central portion thereof, said protrusions spaced apart sufficiently wide to allow a portion of said elastic tubing between said two adjacent protrusions to regain at least in part a non-compressed shape,
a single-needle dialysis catheter having a proximal end in fluid communication via said first tubing extension with said first elastic tubing section, said proximal end of the dialysis catheter also in fluid communication via said third tubing extension with said second elastic tubing section, and
a dialysis circuit originating at said fourth tubing extension of said second tubing section connected to at least an inlet of a dialysis filter, the outlet of said dialysis filter in fluid communication via said third tubing extension with said first elastic tubing section,
whereby said system is configured to alternatingly pump in two phases a first phase defined by withdrawing blood through said dialysis catheter into said first tubing section caused by progressive squeezing thereof by said pumping roller while at the same time occluding without pumping of said second elastic tubing section by said occluding roller, thereby causing blood to flow into said dialysis circuit; and a second phase defined by returning blood from said dialysis circuit through said dialysis catheter by progressive squeezing of said second elastic tubing section by said pumping roller while occluding without pumping of said first elastic tubing section by said occluding roller.

2. The single-needle dialysis system as in claim 1, wherein said dialysis circuit including a blood reservoir connected to said dialysis filter.

3. A single-needle dialysis system comprising:
a peristaltic roller pump comprising a housing with an internal circular opening, said opening including a first half and a second half; a first elastic tubing section placed along and in contact with said first half of said circular opening and having a first tubing extension and a second tubing extension; a second elastic tubing section placed along and in contact with said second half of said circular opening and having a third tubing extension and a fourth tubing extension; and a rotor assembly including a rotor carrying a freely rotating occluding roller on one end and a freely rotating pumping roller on the opposite end of said rotor,
a single-needle dialysis catheter having a proximal end in fluid communication via said first tubing extension with said first elastic tubing section, said proximal end of the dialysis catheter also in fluid communication via said third tubing extension with said second elastic tubing section, and
a dialysis circuit originating at said fourth tubing extension of said second tubing section connected to at least an inlet of a dialysis filter, the outlet of said dialysis filter in fluid
communication via said third tubing extension with said first elastic tubing section,
whereby said system is configured to alternatingly pump in two phases a first phase defined by withdrawing blood through said dialysis catheter into said first tubing section caused by progressive squeezing thereof by said pumping roller while at the same time occluding without pumping of said second elastic tubing section by said occluding roller, thereby causing blood to flow into said dialysis circuit; and a second phase defined by returning blood from said dialysis circuit through said dialysis catheter by progressive squeezing of said second elastic tubing section by said pumping roller while occluding without pumping of said first elastic tubing section by said occluding roller, said alternating pumping in two phases is accomplished while said rotor assembly is continuously rotated in the same direction.

* * * * *